April 30, 1935. R. W. McLEAN 1,999,845
FIBER REMOVING APPARATUS
Filed Dec. 9, 1932   2 Sheets-Sheet 2
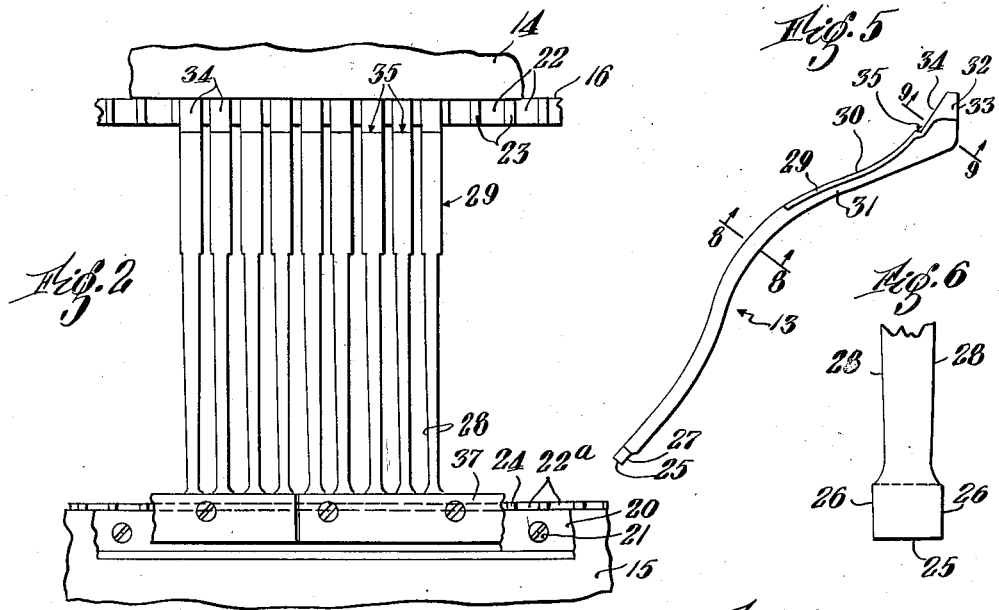
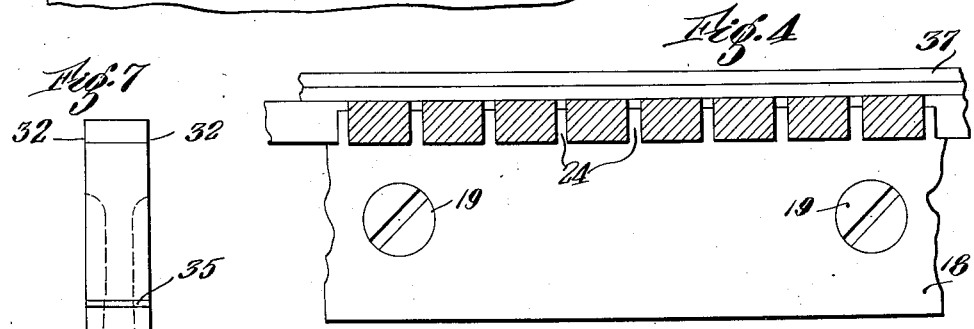
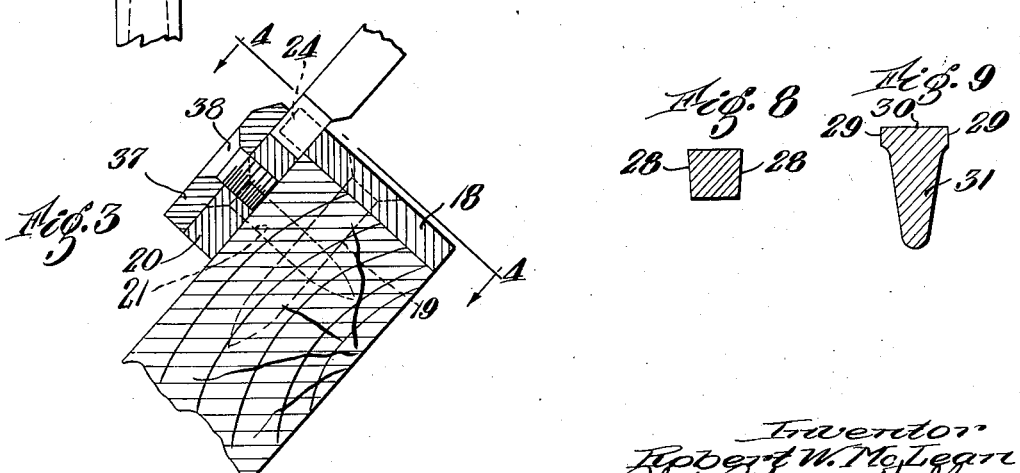

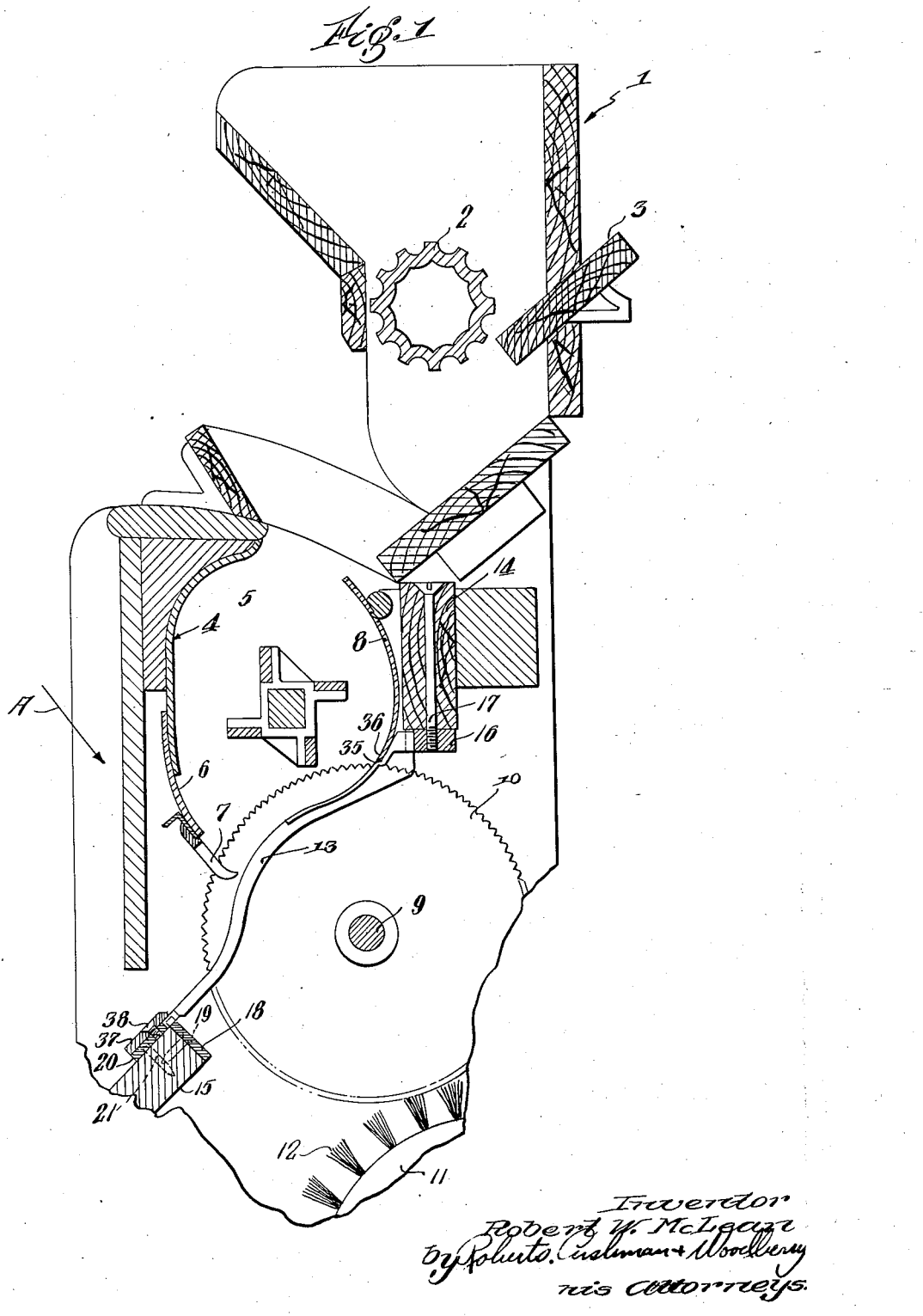

Patented Apr. 30, 1935

1,999,845

UNITED STATES PATENT OFFICE 1,999,845

FIBER REMOVING APPARATUS

Robert W. McLean, Bridgewater, Mass., assignor to Carver Cotton Gin Company, East Bridgewater, Mass., a corporation of Massachusetts Application December 9, 1932, Serial No. 646,505

11 Claims. (Cl. 19—62)

This invention relates to fiber removing machines of the class wherein toothed disks or "saws" projecting through slots between the bars of a "grate-fall" constitute the instrumentalities for separating fibers or fibrous material from its attachment, for example, to seeds. As herein disclosed the invention is shown as embodied in a linter gin for delinting cottonseed, but I contemplate its wider utility in any mechanism of this general class.

In machines of usual type the grate-fall consists of a series of independent cast iron grate bars which are secured in proper relative position by means of wood screws passing through holes in the individual bars and into wooden rails extending transversely at the top and bottom of the grate-fall structure. Since the grate bars are necessarily placed close together, it is the usual practice, in order to avoid cracking the transverse wooden rails, to make the holes in the grate bars at different distances from the ends of the bars so that the attaching screws may be staggered, thereby decreasing the liability to split. However, the grate bars break during use and must be replaced, but as these bars are castings and not usually very accurate in dimensions, while the holes for the attaching screws are not at a uniform distance from the ends of the bars, it is usually necessary to plug up the old screw holes before setting the new bar in place. This operation consumes considerable time, and at best may not result in accuracy of setting, while the replacement of adjacent bars or repeated replacement of a bar at the same position may eventually result in so damaging the rail as to necessitate renewal of the entire structure.

In usual constructions the opposed faces of adjacent bars are recessed or relieved so that at the upper end of each slot which receives a saw disk there is an opening through the grate-fall of substantial size, the theoretical purpose of this opening being to permit foreign matter, such as pebbles or the like, which may be caught by the saws to work between the bars and escape. However, as these holes are soon plugged up during use, this theoretical utility is of no practical value but, on the other hand, it has been observed that even when these openings are apparently plugged or even when the openings are omitted, there is a tendency for fiber to pass between adjacent bars at their upper ends and into the space behind the grate-fall and above the doffing brush. This fiber shows a tendency, perhaps due to electrification, to form into masses of substantial size. If these masses become of sufficient weight, they drop down into the moating space and are moated out with the moats so that this fiber is lost, and loss of fiber from this cause may amount to a very considerable percentage of the total output of the gin. On the other hand, if instead of dropping, these masses, which usually include dirt and trash as well as fiber, are carried along with the other fibers to the condenser, the value of the product of the machine is greatly lessened.

Principal objects of the present invention are to provide a grate-fall structure in which individual bars may be replaced readily, as often as need be, and without substantial waste of machine time or the necessity of employing a skilled workman to make such repairs, while at the same time ensuring a very accurate and predetermined spacing of the grate bars. A further object is to provide a grate-fall structure using independent, interchangeable grate bars but so devised as substantially to eliminate the loss of lint between adjacent bars near their upper ends.

In attaining these objects it is preferred, although not essential, to retain the wooden top and bottom rails of the usual grate-fall structure, but to reduce the dimensions of these rails so as to permit metallic reinforcing bars to be attached to them. These metallic reinforcing bars are furnished with uniformly spaced slots, or recesses with intervening spacers, and the independent grate bars, which are preferably of cast iron, are provided with accurately dimensioned and finished end portions adapted to seat snugly in the slots in the metal reinforce bars of the upper and lower rails.

To prevent the escape of lint from between the bars at their upper ends, a guard member is arranged to extend longitudinally of the series of grate bars and to overlap their upper ends so as to close any crevices which may exist between them at this point. This guard member preferably is a fixed element and may conveniently be the lower portion of the curved inner wall or liner plate of the roll box. This guard member performs the further function of retaining the upper ends of the grate bars in the recesses in the upper rail after they have been inserted therein, the bars preferably having limiting or stop shoulders which are engageable with the edge of this guard member to determine the position of the bars in their slots. The lower ends of the bars preferably are secured in the slots in the lower rail by means of a single removable retaining plate extending along the entire series of bars or at least along a substantial By the use of the metallic reinforce members with their positioning slots and by employing bars having accurately finished and dimensioned end portions, the bars may be used interchangeably with certainty of accurate spacing of the bars after setting and without necessitating any tools other than a screw-driver or wrench for removing and replacing the single retainer plate associated with the lower rail.

Other objects of the invention will be noted from time to time in the further description of the embodiment thereof herein chosen for illustration.

In the accompanying drawings wherein the invention is shown as embodied in a linter gin of a usual type, Fig. 1 is a vertical section showing the upper front portion only of a gin, including the feed hopper, roll box, saw cylinder, and my improved grate-fall;

Fig. 2 is a fragmentary elevation of the grate-fall looking substantially in the direction of the arrow A (Fig. 1), certain parts being omitted and others being broken away;

Fig. 3 is a vertical section, to larger scale, through the lower rail of the grate-fall structure;

Fig. 4 is a section substantially on the line 4—4 of Fig. 3;

Fig. 5 is a side elevation of one of the improved grate bars removed from the grate-fall structure;

Fig. 6 is a fragmentary front view, to larger scale, illustrating the lower end of one of the grate bars;

Fig. 7 is a view similar to Fig. 6, but showing the upper end of the grate bar;

Fig. 8 is a section, to larger scale, on the line 8—8 of Fig. 5; and

Fig. 9 is a section, to larger scale, on the line 9—9 of Fig. 5.

Referring to the drawings, the numeral 1 designates the feed hopper of a linter gin, such hopper having the ribbed feed roll 2 cooperating with the sliding gate 3 to deliver the seed at a proper rate to the roll box of the gin. The breast structure of the gin comprises the breast board 4 constituting the forward wall of the roll box 5, the breast board carrying the adjustable rake head 6 comprising the spaced teeth 7. The rear wall of the roll box is defined by the forwardly concave liner plate 8 which may be of metal and which is fixedly secured at its opposite ends to the end members of the breast structure.

The saw shaft 9 carries the saw cylinder 10, consisting of a series of spaced peripherally toothed saw disks, and to one side of the cylinder is arranged the doffing brush 11 having the brush bristles 12. The upper part of the saw cylinder projects up through the bars 13 of the grate-fall, the upper and lower ends of these bars being secured respectively in the upper and lower rails of the grate-fall structure now to be described.

As here illustrated, the upper rail comprises a transversely elongate wooden bar 14 having a longitudinally extending metallic reinforcing bar 16 fixedly secured to its lower surface by means of bolts 17. While this structure is desirable, particularly when it is proposed to embody the present invention in an existing gin having the usual wooden top and bottom rails, and while the employment of rails which, in part at least, are of wood is desirable for the sake of lightness and cheapness, I contemplate that the rails may be of unitary construction, if desired, in which event they will preferably be made wholly of metal, either castings or stampings.

The lower rail comprises the wooden bar 15 which, as is usual in such structures, is inclined upwardly and rearwardly. This bar is reinforced by means of a longitudinally extending metal bar 18 (Figs. 1 and 3) secured to its upper rear edge by means of the screws 19. In accordance with the present invention a stop member 20, preferably an elongate metal strip, is secured to the upper inclined forward surface of the bar 15 by means of screws 21 or other suitable fastening means.

The forward edge of the metal reinforce bar 16 (or the equivalent part of the unitary rail member, if such unitary rail be employed) is provided with a series of uniformly spaced slots 22 (Fig. 2), each of substantially the same width, such slots or recesses being separated by the spacer ribs or members 23. The upper edge of the reinforcing bar 18 of the lower rail is also furnished with uniformly spaced recesses 22$^a$ (Fig. 2) preferably of the same width as the recesses 22 of the upper rail and aligned respectively with the latter recesses, the recesses 22$^a$ being separated by the spacer ribs 24. The recesses in the bars 16 and 18 are conveniently formed by a milling operation which produces the desired accuracy of dimension.

The grate bars 13 preferably are of cast iron and may, if desired, be hardened at those portions where wear occurs. While I contemplate that these bars may be made of other materials than cast iron, I find the latter well suited for this purpose.

These bars are curved substantially like the usual bars employed in such structures, and the lower extremity 25 of each bar, and the side faces 26 and the bottom faces 27 at the lower end of the bar are finished, for example, by grinding, to accurate dimensions. The distance between the finished surfaces 26 is such that the lower end of the bar fits snugly within one of the recesses 22$^a$ of the bar 18, with the finished surface 27 seating on the bottom of such recess and with the finished surface 25 engaging the upper edge of the stop piece 20.

Immediately above this lower end of the bar, the width of the bar preferably decreases abruptly, and the side surfaces 28 of this narrow portion of the bar need not be finished. This narrow unfinished portion of the bar reaches up to that part of the bar which takes part with the saws in the ginning action, where the width of the bar is greater. At this wider portion of the bar, which extends throughout a considerable extent of its upper part, and where the bar cooperates with the down-going teeth of the saws in performing the ginning operation, the bar is of substantially uniform width and its lateral faces 29 are accurately parallel and finished, preferably by grinding. The upper edge 30 of the bar may be smoothly finished and polished, while the lower part 31 of the bar preferably tapers downwardly below the finished edge surface 29. As indicated in Figs. 5 and 9, these finished edge surfaces are preferably of no great vertical depth so as to avoid undue friction between the bars and the saws. This lower part 31, which tapers downwardly, preferably increases in depth toward the upper end of the bar, being at a maximum just below the extreme upper end. The side surfaces 32 at the upper end of the bar are accurately flat and parallel, preferably forming continuations of the flat finished surfaces 29, and these surfaces 32 are so spaced that the upper end of the bar may fit snugly within one of the slots 22 of the member 16. The rear surface 33 of the upper end of the bar is accurately finished and adapted to seat against the bottom of the slot or recess 22 while the forward surface of the bar at its upper end is provided with the elongate recess 34 terminating abruptly at the stop shoulder 35. This stop shoulder is located at an accurate predetermined distance from the finished surface 25 at the lower extremity of the bar.

The end portions of these bars and the side surfaces 29 are made accurately to predetermined dimensions so that the bars may be used interchangeably.

In assembling the bars in the grate-fall structure it is merely necessary to insert the upper end of the bar by an upward movement into one of the slots 22 of the member 16 until the shoulder 35 of the bar comes into engagement with the lower edge 36 of the member 8, it being noted that the lower portion 36 of this liner member 8 extends downwardly beyond the plane of the member 16 so as to overlap the slots or recesses 22. Having inserted the upper end of the bar in the slot 22, its lower end is dropped down into the corresponding slot 22ª of the bar 18. In this position, and while the shoulder 35 of the bar engages the lower edge of the member 8, the finished surface 25 at the lower end of the bar contacts with the upper edge of the stop member 20 so that the bar is accurately positioned both laterally and longitudinally. Having assembled all of the bars of the series in this manner, an elongate retaining plate 37, which, if desired, may be made in independent sections, is superposed upon the stop member 20 with its upper edge overlapping the series of bars 13, and in this position it is fixed by means of screws 38 or equivalent devices.

If one of the grate bars is broken during use, it is merely necessary to remove one of the sections of the member 37, take out the broken bar, if it has not dropped out, and insert a new bar in its place by first pushing the upper end of the bar into the slot 22 and then dropping the lower end into the slot 22ª, all of which may be done without disturbing the other bars, after which the section of retaining plate 37 is replaced and secured in position. All of these operations may be performed in a very short time and without requiring any particular skill or the use of special tools. It may be noted in this connection, that since the ends of the bars are imperforate, that is devoid of holes, slots or the like for the reception of attaching screws or similar fasteners, they are stronger and much less liable to breakage than are the usual perforated bars.

By reason of the fact that the lower part 36 of the liner plate 8 extends downwardly over the tops of all of the bars 13, it not only holds the upper ends of the bars in place in their slots 22 but also effectively closes the spaces between such bars down substantially to the point at which the periphery of the saw passes downwardly between the bars, and thus the escape of lint between the bars at their upper ends is effectively prevented.

While I have herein illustrated one desirable embodiment of the invention by way of example, I wish it to be understood that the invention is not necessarily restricted to the shapes, dimensions, proportions or relative arrangement of parts herein specifically illustrated, but that changes and the substitution of equivalents may be made within the scope of the appended claims without departing from the invention.

I claim:

1. A cotton gin having a saw cylinder and a grate-fall structure, the latter including a top rail and a bottom rail, each rail comprising a part provided with uniformly spaced recesses, an elongate guard member overlapping the recessed portion of the upper rail, said guard member having a substantially straight and unbroken lower edge, a series of spaced grate bars between which the cotton is ginned, each bar having imperforate end portions shaped to fit within a recess of the upper and lower rails, respectively, each bar having a stop shoulder engageable with the lower edge of said guard member, and a removable retainer member overlapping the lower ends of the bars and normally securing them in the recesses of the lower rail.

2. A cotton gin having a saw cylinder and a grate-fall structure, the latter including a top rail and a bottom rail, each rail comprising a part provided with uniformly spaced recesses therein, an elongate guard member overlapping the recessed portion of the upper rail, said guard member having a substantially straight and unbroken lower edge, a series of spaced grate bars between which the cotton is ginned, each bar having an imperforate upper end shaped to permit it to enter, by upward movement, one of the recesses of the upper rail and having a stop engageable with the lower edge of the guard member to limit such movement, each rail having a lower end portion shaped to enter, by downward movement, one of the recesses of the lower rail, a stop engageable with the lower extremity of each bar to prevent endwise movement of the bar, and a removable retaining member normally overlapping the lower ends of the bars for securing them in the recesses of the lower rail.

3. A cotton gin having a saw cylinder, a roll box and a grate-fall, the latter comprising upper and lower transverse rails and a series of spaced independent parallel grate bars with which the saw cylinder cooperates to remove fiber from the seeds, the roll box having a concave liner member forming its rear wall, the lower portion of said liner member extending downwardly and overlapping the upper ends of the grate bars thereby to guard the crevices between the upper ends of adjacent bars against passage of lint therethrough, the lower edge of said liner member being disposed substantially at the point at which the periphery of the saw passes downwardly between adjacent bars.

4. A cotton gin having a saw cylinder and a grate-fall, the latter comprising upper and lower transverse rails and a series of spaced independent parallel grate bars with which the saw cylinder cooperates to remove fiber from the seeds, and a transversely elongate guard member having a substantially straight and continuous lower edge, said member overlying the upper ends of the series of grate bars, the lower portion of said guard member being curved and merging smoothly into the upper surfaces of the bars, said guard member being operative to prevent escape of lint between the upper parts of adjacent bars of the series.

5. A cotton gin having a saw cylinder and a grate-fall, the latter comprising upper and lower transverse rails and a series of spaced independent parallel grate bars with which the saw cylinder cooperates to remove fiber from the seeds, and guard means bridging the crevices between the upper ends of adjacent bars of the series to prevent escape of lint between them, said guard means closing said crevices substantially down to the point at which the peripheries of the saws pass downwardly between adjacent grate bars.

6. A cotton gin having a saw cylinder and a grate-fall, the latter comprising upper and lower transverse rails and a series of spaced independent parallel grate bars with which the saw cylinder cooperates to remove fiber from the seeds, each bar having an elongate recess in its forward face, such recess extending downwardly from its upper end and terminating in an abrupt shoulder having a finished surface accurately spaced from one end of the bar, and a transversely elongate guard plate having a substantially straight and unbroken lower edge, said plate having its lower portion disposed in the recess of the grate bar and its lower edge engaging the stop shoulder of the bar thereby accurately to determine the position of the bar in a longitudinal direction.

7. A cotton gin having a saw cylinder and grate-fall structure, the latter including a top rail and a bottom rail, each rail comprising a metallic member provided with uniformly spaced recesses, a series of spaced independent grate bars between which the cotton is ginned, each bar having imperforate upper and lower ends, respectively, disposed in corresponding recesses of the upper and lower rail, a guard having a substantially straight and unbroken lower edge, said guard being fixed relatively to the upper rail and arranged to overlap the upper ends of the grate bars seated in the recesses of the upper rail, and an elongate removable retainer plate overlapping the lower ends of the bars which are seated in the recesses of the lower rail.

8. A grate-fall structure for use in machines of the class described, said structure including substantially parallel upper and lower rails, the upper rail comprising a part having uniformly spaced forwardly open slots and the lower rail comprising a part having uniformly spaced upwardly open slots, the slots of the upper and lower rails being aligned with each other, limiting stop means carried by the lower rail, a guard member forwardly spaced from and overhanging the slotted part of the upper rail, said guard member having a substantially straight and continuous lower edge, a series of independent grate bars, each bar having an imperforate upper end shaped to fit within one of the slots in the upper rail and having a stop element engageable with the lower edge of the guard member, each grate bar having an imperforate lower end shaped to fit in a slot of the lower rail with its lower extremity engaging the limiting stop means of the lower rail, and a removable transversely extending retainer member normally overlapping the lower ends of the bars which are disposed in the slots in the lower rail.

9. A machine of the class described having a roll box, a saw cylinder and a grate-fall, the latter comprising upper and lower transverse rails and a series of spaced independent parallel grate bars with which the saw cylinder cooperates to remove fiber from the seeds, and a forwardly concave curved plate having a substantially continuous, unbroken lower edge overlapping the upper ends of the series of grate bars whereby to prevent passage of lint between the upper parts of adjacent bars, said plate constituting a rear liner member for the roll box, the lower edge of the plate being located substantially at the point at which the periphery of the saw passes rearwardly between adjacent grate bars.

10. A machine of the class described having a saw cylinder and a grate-fall, the latter comprising upper and lower transverse rails and a series of spaced independent parallel grate bars, with which the saw cylinder cooperates to remove fibers from the seeds, each bar having a stop shoulder accurately spaced from its lower end, and a guard overlapping the upper ends of the series of bars, said guard engaging the stop shoulder of each bar for positioning the latter and covering the crevices between the upper ends of adjacent bars down substantially to the point at which the periphery of a saw passes rearwardly between adjacent grate bars.

11. A machine of the class described having a saw cylinder and a grate-fall, the latter comprising upper and lower transverse rails and a series of spaced independent parallel grate bars with which the saw cylinder cooperates to remove fiber from its attachments, the forward face of each bar, near the upper end of the latter, having an elongate recess extending downwardly from said end, and a transversely elongate guard member overlapping the upper ends of the bars of the series and seated in the recess of each bar, the lower edge of said guard member being substantially straight and unbroken, and being disposed substantially at that point at which the periphery of a saw passes rearwardly between adjacent grate bars.

ROBERT W. McLEAN.